Dec. 21, 1948.　　　　　D. E. KENYON　　　　　2,456,638
POWER SUPPLY FILTER AND REGULATOR
Filed March 22, 1946　　　　　　　　　　2 Sheets-Sheet 1

INVENTOR
DAVID E. KENYON
BY Paul B. Hunter
ATTORNEY

Dec. 21, 1948.    D. E. KENYON    2,456,638
POWER SUPPLY FILTER AND REGULATOR
Filed March 22, 1946    2 Sheets-Sheet 2

INVENTOR
DAVID E. KENYON
BY
Paul B. Hunter
ATTORNEY

Patented Dec. 21, 1948

2,456,638

UNITED STATES PATENT OFFICE 2,456,638

POWER SUPPLY FILTER AND REGULATOR

David E. Kenyon, Smithtown Branch, N. Y., assignor to The Sperry Corporation, a corporation of Delaware Application March 22, 1946, Serial No. 656,199

8 Claims. (Cl. 323—30)

The present invention relates to direct-current power supply apparatus.

An object of the present invention is to provide improved power supply apparatus.

It is an important object to provide high-performance power supply filter and regulator appartus of great economy and efficiency relative to weight and size.

A further object is to provide power supply apparatus characterized by adequate filtering and regulation of output voltage with maximum economy as to cost, weight and volume of apparatus.

Where a source of direct-current power at high voltage is required, as for anode current supply for utilization apparatus such as a radio receiver, it has become common practice to provide a rectifier for receiving an alternating voltage and passing pulsating unidirectional current and a filter system for receiving the unidirectional current from the rectifier and providing substantially direct-current output power at high voltage. Particularly where very high amplification is employed in the utilization apparatus, as in a sensitive radio receiver, it is important that very complete filtering be provided, so that the alternating components of the power supply output voltage will not be of sufficient intensity to cause objectionable disturbances in the receiver or other load apparatus.

In many instances, moreover, the performance of utilization apparatus requiring the high-voltage direct-current power may depend critically upon the magnitude of the direct voltage supplied thereto. This is especially true, for example, where utilization apparatus to which the direct voltage is supplied is a high-frequency local oscillator of a superheterodyne receiver, or measuring apparatus of such a nature that its accuracy of calibration is dependent upon supply voltage magnitude. For this purpose, electronic voltage regulator circuits have been incorporated in rectifier-filter power supplies. While these electronic voltage regulators have taken various forms, one of the best known and most effective electronic regulator circuits includes an electron discharge device such as a grid-controlled vacuum tube connected in series between the output terminals of the power supply filter and the output voltage terminals of the apparatus, with a device which may include a voltage reference source and an electron discharge device connected as an amplifier for controlling the grid bias of the series connected electron discharge device in accordance with power supply output voltage variations.

Such voltage regulator arrangements are effective to some extent in the suppression of alternating voltage components at the output of the filter circuit. Accordingly, where a voltage regulator circuit has been employed, it has been found that a less extensive filter network could be employed. The electronic voltage regulator augments the somewhat simplified filter circuit, in such a way that the alternating voltage components are as effectively suppressed as with non-regulated power supplies having more elaborate filters.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with the present invention, the performance of an electronic voltage regulator is so improved as to permit a material further simplification and economy of the filter apparatus, the electronic voltage regulator being made to contribute a much greater share toward the suppression of alternating voltage components. For this purpose, a series-connected electron discharge device including not only a control electrode but also a high potential screen grid electrode is provided. While such a tube is capable of higher amplification and consequently more complete alternating component suppression, its performance is greatly dependent upon variations of the potential of the screen grid. It has been found that if the voltage of the series regulator tube is separately filtered, as with light-weight and inexpensive filter components, the alternating voltage components may be very effectively suppressed by the action of the series-connected electron discharge device. This suppression of alternating voltage components in the improved voltage regulator of the present invention is so effective, and the voltage regulator circuit elements are so simple that an appreciable economy of size and weight of components is achieved in comparison to prior rectifier-filter power supplies both of the unregulated type and of the regulated type. Features of compactness and light weight are thus achieved with a material saving of cost and gain in performance.

The above objects and features of the present invention will be more fully appreciated, and other objects will be apparent, from the following description, in conjunction with the drawings, wherein Fig. 1 illustrates a conventional unregulated power supply provided with a two-section filter for suppression of alternating components;

Figure 1:
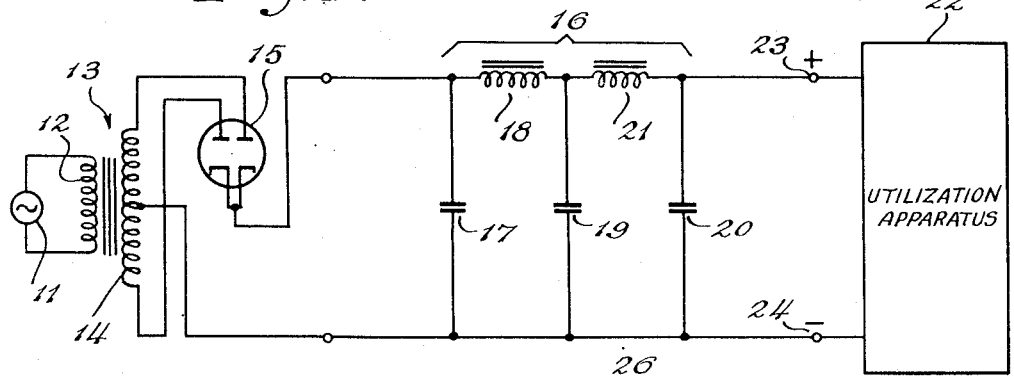
Figure 2:
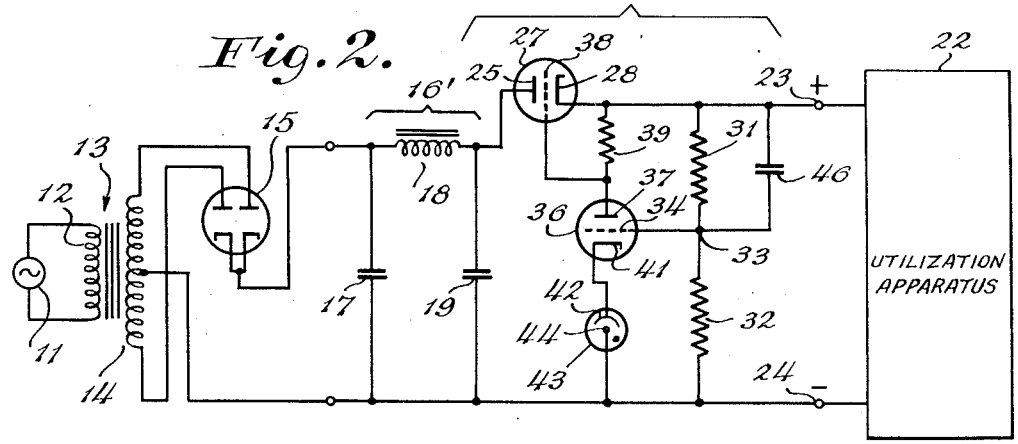
Fig. 2 illustrates a simple regulated power supply of conventional design.

Referring now to Fig. 1, there is shown an alternating voltage source 11 connected to the primary winding 12 of a power transmitter 13 having a center tapped secondary winding 14. The end terminals of the secondary winding 14 may be connected to the anodes of a dual-diode rectifier 15. The center tap of winding 14 serves as the negative output connection of the transformer and rectifier circuit 13, 15, while the cathodes of the dual diode rectifier 15, connected together, serve as the positive output terminal of the transformer-rectifier circuit. A filter circuit 16 including an input shunt capacitor 17, a first series inductor 18, a second shunt capacitor 19, a second series inductor 21 and an output shunt capacitor 20 is provided for suppressing the alternating components in the output of the transformer-rectifier circuit 13, 15. The input capacitor 17 of filter 16 is connected between the center tap of the transformer secondary winding 14 and the cathodes of rectifier tube 15. A positive output terminal 23 and a negative output terminal 24 connected to capacitor 20 are provided for connection to a direct-current power utilization apparatus 22.

Where the performance of the utilization apparatus may be enhanced by close regulation of the voltage supplied thereto, it has been the practice to incorporate an electronic voltage regulator 26 in the power supply apparatus, as illustrated in Fig. 2. With such a regulator 26, a single-section filter 16' including the input capacitor 17, inductor 18 and capacitor 19 may be found adequate, since the regulator circuit 26 contributes to the suppression of alternating voltage components and thus provides augmentation of the single section filter 16'.

The conventional voltage regulator 26 comprises an electron discharge device 27 connected in series between the positive output terminal of filter 16' and the positive power supply output terminal 23, the anode 25 of device 27 being connected to the positive filter output terminal and the cathode 28 being connected to the positive output power supply terminal 23. A voltage divider including resistors 31 and 32 is connected between the power supply output terminals 23 and 24, and the intermediate terminal 33 of the voltage divider is connected to the control electrode 34 of an electron discharge device 36 having its anode 37 connected to the control electrode 38 of device 27, and also to a resistor 39 connected to the positive output terminal 23. The cathode 41 of electron discharge device 36 is connected to the anode 42 of a gaseous voltage regulator tube 43, and the cathode 44 of the gaseous discharge tube 43 is connected to the negative output terminal 24.

Current flowing through the series resistor 39 and the anode-cathode circuit of electron discharge device 36 produces a voltage drop between the anode 42 and the cathode 44 of the gaseous discharge tube 43 of a substantially constant value dependent upon the design of the gaseous discharge tube and substantially independent of the magnitude of current therethrough. Cathode 41 is thus maintained at a substantially constant and appreciable positive voltage with respect to the negative terminal 24. The resistance proportions of the voltage divider 31, 32 are fixed so that when a desired voltage is developed between terminals 23 and 24, the voltage drop across resistor 32 is slightly lower than the voltage drop across the gaseous discharge tube 43. Accordingly, the control electrode 34 of device 35 normally is maintained at a slight negative bias potential difference with respect to the associated cathode 41. Consequently, small changes of potential at terminal 23 result in the application to the control electrode 34 of device 36 of appreciable relative voltage variations with respect to the cathode thereof, in turn causing appreciable variations of current through resistor 39 and accordingly of the negative voltage applied to control electrode 38 with respect to the cathode 28 of the series regulator tube 27.

Upon a slight increase of the power supply voltage between terminals 23 and 24, there is an appreciable increase of current through device 36 and hence through resistor 39, so that the control electrode 38 is made appreciably more negative with respect to the cathode 28, thus effectively suppressing the variation of output voltage. Since the action of the voltage regulator 26 is substantially instantaneous, it acts not only to hold the average power supply output voltage substantially constant, but also to suppress alternating voltage components at the output of the power supply. The suppression of alternating components may be enhanced by the connection of a capacitor 46 across resistor 31, for accentuating alternating voltage variations at control electrode 34 and accordingly for improved alternating component suppression by the resistance variations of series regulator tube 27.

It has been generally recognized that the conventional electronic voltage regulator 26 is not so thorough in its alternating voltage component suppression as to warrant further filter simplification than the elimination of a second filter section. In accordance with a major feature of the present invention, however, a combined filter and voltage regulator arrangement 26' has been evolved for greatly enhanced suppression of alternating voltage components, so as to permit a material further simplification of the filter apparatus.

A series regulator tube 27' including not only a control electrode 38 but also a high-voltage screen grid 51 is provided with its cathode 28 connected to the positive output terminal 23. The anode 25 of the series regulator tube 27 is connected to the positive terminal of the filter input capacitor 17 and thus directly to the output circuit of the rectifier 15.

Figure 3:
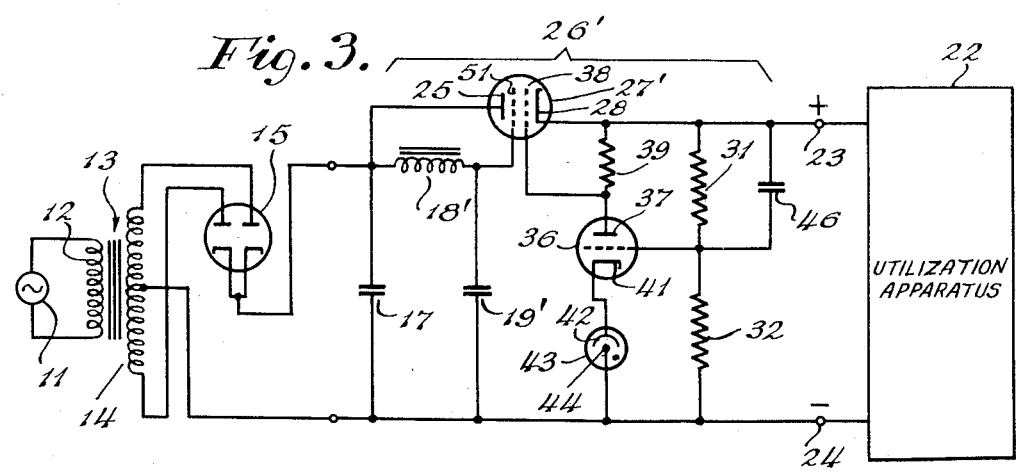
Figs. 3, 4 and 5 illustrate embodiments of the present invention wherein improved electronic regulator performance obviates expensive and cumbersome filter components.

Further filter components 18' and 19' are employed for the suppression of alternating voltage components between the negative output terminal 24 of the power supply and the screen grid 51 of tube 27'. The remaining circuit components including the resistors 31, 32 and 39, electron discharge device 36, gaseous discharge device 43 and capacitor 46 are connected in the same manner as illustrated in Fig. 2. The inductor 18' in the arrangement illustrated in Fig. 3 is not included in the main load current path through the anode 25 and cathode 28 of tube 27', and hence the direct current flowing through this inductor is limited to the very small screen grid current required by series regulator tube 51. The inductor 18' accordingly may be very small and inexpensive, as compared with a filter inductor 18 of comparable inductance but of such a large size as is required for the high current capacity corresponding to the current consumption of utilization apparatus 22. Furthermore, the capacitance value of capacitor 19' may be much smaller than that of capacitor 19, since the impedance presented by the screen grid 51 of tube 27' is extremely high.

Thus, since filter components 18' and 19' are designed for very small current capacity, the screen voltage may be very completely filtered without the requirement of large, heavy, expensive filter components.

Figure 4:
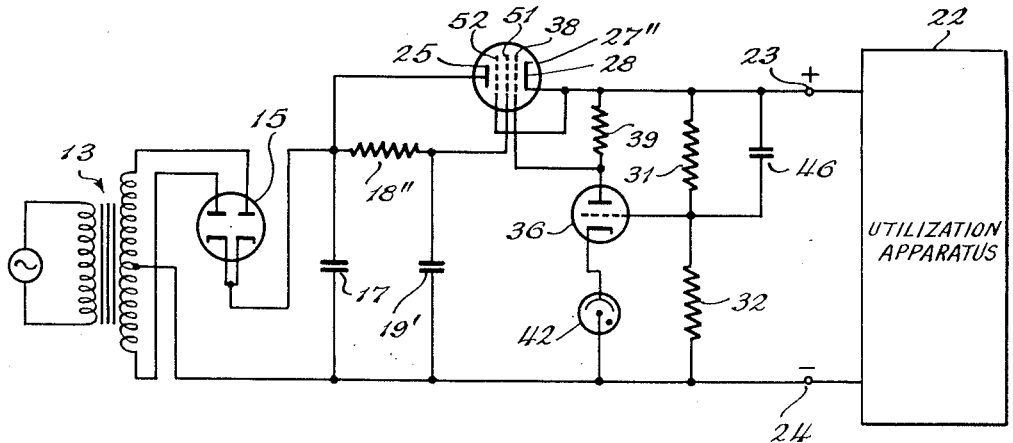

As illustrated in Fig. 4, a screen-grid tube of the pentode type 27" (including not only a screen grid 51 but also a suppressor grid 52) may be employed in the present invention. The suppressor grid 52 is connected to cathode 28. Moreover, as illustrated in Fig. 4, a resistor 18" may be employed as the series filter impedance between input capacitor 17 and capacitor 19' for filtering the voltage supplied between the screen grid 51 and the negative power supply output terminal 24. The use of a resistor for this purpose is made feasible by the arrangement of the present invention whereby only the relatively small screen grid current flows through the filter series impedance.

Figure 5:
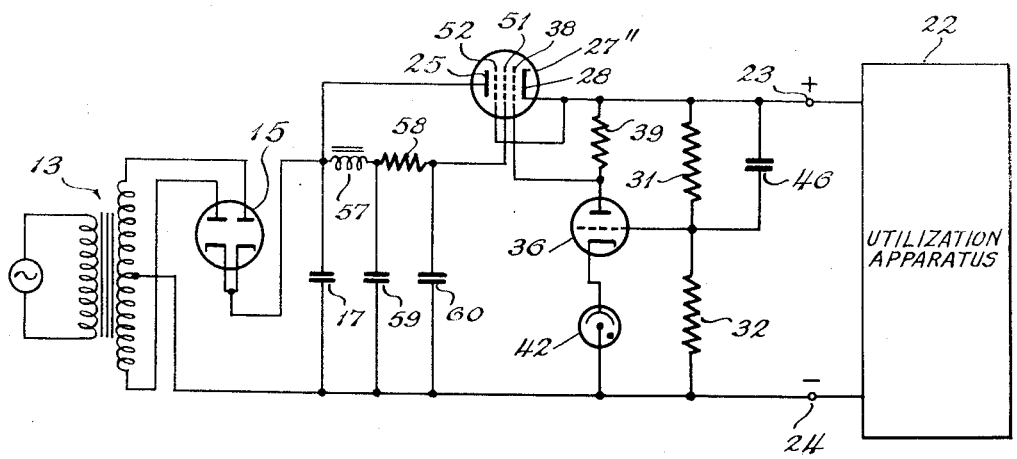

Moreover, if desired, a two-section filter incorporating two series impedance elements 57 and 58 and including an intermediate capacitor 59 and an output filter capacitor 60 may be employed as illustrated in Fig. 5.

A suitable series regulator tube for a power supply in accordance with the present invention must be chosen according to the operating voltage and current requirements of the utilization apparatus 22. This tube may be selected from a wide variety of screen-grid tubes, including pentodes and beam-power tubes. A type 6V6 tube has been employed as the series-connected screen-grid tube in one version of the present invention, and a type 6Y6G has been employed in another.

It will be readily apparent that many variations may be made in the circuit connections of the control amplifier electron discharge device 36, and in the voltage reference circuit therefor; e. g., screen grid or pentode amplifier tubes may be employed with gaseous discharge devices or batteries as the reference voltage control device as is well known, as set forth for example in a paper on electronic voltage stabilizers, by Hunt and Hickman, page 6, volume 10 of the Review of Scientific Instruments; and a further paper on voltage regulated power supplies, Alexander Bereskin, page 47, volume 31 of Proceedings of the I. R. E., February 1943.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Filter and voltage regulator apparatus for receiving a rectified voltage and delivering a filtered and regulated voltage, comprising a filter section having an input capacitor, an output capacitor, and an impedance connected therebetween; a voltage regulator tube having an anode, a cathode, a control electrode and a screen grid; means connecting the junction between said input capacitor and said impedance to the anode of said regulator tube; means connecting the junction between said impedance and said output capacitor to the screen grid of said regulator tube; and means coupled to the cathode of said regulator tube and to said control electrode for applying between said cathode and said control electrode a voltage varying in a predetermined relation to the difference between the voltage across said output capacitor and the voltage drop from anode to cathode of said regulator tube.

2. Filter and voltage regulator apparatus as defined in claim 1, wherein said last-named means comprises amplifying means for applying between said cathode and said control electrode a voltage biasing said control electrode negatively with respect to said cathode and increasing as the output voltage increases and decreasing as the output voltage decreases.

3. Filter and voltage regulator apparatus for receiving a rectified voltage and delivering a filtered and regulated voltage, comprising a filter having an input capacitor and an output capacitor and an impedance connected therebetween; a voltage regulator tube having an anode, a cathode, a control electrode and a screen grid; means connecting the junction between said input capacitor and said impedance to the anode of said regulator tube; means connecting the junction between said impedance and said output capacitor to the screen grid of said regulator tube; and means coupled to the cathode of said regulator tube and to said control electrode for applying to said control electrode a negative bias relative to said cathode varying in magnitude directly as the difference between the voltage across said output capacitor and the voltage drop from the anode to the cathode of said regulator tube.

4. Filter and voltage regulator apparatus for receiving pulsating unidirectional current and delivering direct-current power to utilization apparatus at a predetermined voltage, comprising a regulator tube having an anode, a cathode, a control electrode and a screen grid; means connecting the anode and cathode of said regulator tube in series with said utilization apparatus for conducting thereto a component of said unidirectional current; means connected to the cathode and the control electrode of said regulator tube for applying to said control electrode a bias voltage with respect to said cathode varying according to variations of the voltage supplied to said utilization apparatus; and filter means receiving a component of said unidirectional current for applying a filtered version thereof to said screen grid.

5. Filter and voltage regulator apparatus for receiving pulsating unidirectional current at a pair of input terminals and delivering direct-current power at high voltage between a pair of output terminals, comprising positive and negative input terminals; a regulator tube having a cathode, an anode, a control electrode and a screen grid; means coupling said anode to said positive input terminal; filter means coupling said screen grid to said positive input terminal; and means coupled to said negative input terminal and the control electrode and cathode of said regulator tube for biasing said control electrode relative to said cathode variably according to variations of the voltage between said cathode and said negative input terminal.

6. Voltage control apparatus comprising an electron discharge device including an anode, a cathode, a control electrode and a screen grid; a negative power output terminal; a positive power output terminal coupled to said cathode; impedance means connected between said anode and said screen grid; capacitance means connected between said screen grid and said negative power output terminal; and means connected between said negative power output terminal and said control electrode for maintaining said control electrode at a potential difference from said cathode varying as a predetermined function of the voltage between said negative and positive power output terminals.

7. Voltage control apparatus comprising a regulator electron discharge device including an anode, a cathode, a control electrode and a screen grid; a negative power output terminal; a positive power output terminal coupled to said cathode; impedance means connected between said anode and said screen grid; capacitance means connected between said screen grid and said negative power output terminal; means for supplying variable unidirectional voltage between said anode and said negative power output terminal, whereby a filtered version of said unidirectional voltage is developed between said screen grid and said negative power output terminal; and control electrode potential supply means coupled to said control electrode and to said negative power output terminal for varying the conductivity of said electron discharge device inversely according to variation of voltage between said negative and positive power output terminals to suppress said variations.

8. A power supply for delivering a regulated output voltage to a load, comprising a pair of output terminals, rectifier means for generating a pulsating unidirectional voltage, and a two-stage degenerative amplifier system coupling said rectifier means to said output terminals, said two-stage degenerative amplifier system comprising a first vacuum tube amplifier stage and a tetrode second amplifier stage connected in cascade therewith, said first amplifier stage having its input circuit coupled to said output terminals and its output circuit coupled to the grid circuit of said tetrode second amplifier stage, and said tetrode second amplifier stage having its anode-cathode circuit connected between said rectifier means and one of said output terminals and thereby in series with said load, and filter means interposed between the screen grid of said tetrode second stage and the connection of said anode-cathode circuit to said rectifier means.

DAVID E. KENYON.

REFERENCES CITED

The following references are of record in the file of this patent:

UNITED STATES PATENTS

| Number | Name | Date |
|---|---|---|
| 2,316,577 | Ford et al. | Apr. 13, 1943 |
| 2,318,644 | Tubbs | May 11, 1943 |
| 2,351,982 | Lenehan | June 20, 1944 |